United States Patent
Hanay et al.

(10) Patent No.: US 11,005,836 B2
(45) Date of Patent: May 11, 2021

(54) SEAMLESS WIRELESS DEVICE ONBOARDING

(71) Applicant: Extreme Networks, Inc., San Jose, CA (US)

(72) Inventors: John William Hanay, Palo Alto, CA (US); Daniel O'Rorke, Sunnyvale, CA (US); Shruti Narayan, Sunnyvale, CA (US)

(73) Assignee: Extreme Networks, Inc., San Jose, CA (US)

( * ) Notice: Subject to any disclaimer, the term of this patent is extended or adjusted under 35 U.S.C. 154(b) by 162 days.

(21) Appl. No.: 15/623,122

(22) Filed: Jun. 14, 2017

(65) Prior Publication Data

US 2017/0359332 A1 Dec. 14, 2017

Related U.S. Application Data

(60) Provisional application No. 62/350,158, filed on Jun. 14, 2016.

(51) Int. Cl.
*H04L 29/06* (2006.01)
*H04W 12/00* (2021.01)
*H04W 12/04* (2021.01)
*H04W 12/06* (2021.01)
*H04W 48/02* (2009.01)

(52) U.S. Cl.
CPC ........ *H04L 63/083* (2013.01); *H04L 63/0435* (2013.01); *H04L 63/062* (2013.01); *H04L 63/068* (2013.01); *H04L 63/0876* (2013.01); *H04L 63/102* (2013.01); *H04W 12/0023* (2019.01); *H04W 12/04* (2013.01); *H04W 12/06* (2013.01); *H04W 48/02* (2013.01)

(58) Field of Classification Search
CPC . H04L 63/083; H04L 63/0435; H04L 63/102; H04L 63/062; H04L 63/0876; H04L 63/068; H04W 48/02; H04W 12/06; H04W 12/04; H04W 12/0023
See application file for complete search history.

(56) References Cited

U.S. PATENT DOCUMENTS

| | | | |
|---|---|---|---|
| 9,621,540 B2 | 4/2017 | Almahallawy | |
| 9,705,916 B2 | 7/2017 | Ben-Shalom | |
| 10,360,362 B2 * | 7/2019 | Rattner | G06F 21/34 |
| 10,375,045 B2 * | 8/2019 | Schatzmann | H04L 63/08 |

(Continued)

OTHER PUBLICATIONS

Y. Liu, J. Wang, H. Du and L. Zhang, "Key Sharing in Hierarchical Wireless Sensor Networks," 2010 IEEE/IFIP International Conference on Embedded and Ubiquitous Computing, Hong Kong, 2010, pp. 743-748. (Year: 2010).*

(Continued)

*Primary Examiner* — Robert B Leung
*Assistant Examiner* — Sameera Wickramasuriya
(74) *Attorney, Agent, or Firm* — Sterne, Kessler, Goldstein & Fox P.L.L.C.

(57) ABSTRACT

Techniques for seamlessly onboarding a wireless device. A system utilizing such techniques can include a key-based authentication system and a unique pre-shared key seamless onboarding system. A method utilizing such techniques can include key-based authentication management and unique pre-shared key seamless onboarding management.

20 Claims, 7 Drawing Sheets

(56) References Cited

U.S. PATENT DOCUMENTS

| | | | | |
|---|---|---|---|---|
| 2005/0055570 A1* | | 3/2005 | Kwan | H04L 63/08 726/4 |
| 2005/0262164 A1 | | 11/2005 | Guiheneuf | |
| 2009/0217033 A1* | | 8/2009 | Costa | H04L 63/08 713/155 |
| 2010/0043061 A1 | | 2/2010 | Martin | |
| 2012/0167185 A1 | | 6/2012 | Menezes | |
| 2013/0007848 A1 | | 1/2013 | Chaskar | |
| 2013/0166910 A1* | | 6/2013 | Wilkinson | H04W 12/04 713/168 |
| 2013/0346302 A1* | | 12/2013 | Purves | G06Q 20/102 705/40 |
| 2014/0173692 A1 | | 6/2014 | Srinivasan | |
| 2014/0223533 A1 | | 8/2014 | Vitali | |
| 2014/0259094 A1 | | 9/2014 | Narayanaswamy | |
| 2014/0282902 A1* | | 9/2014 | Zou | H04L 63/08 726/4 |
| 2014/0282916 A1* | | 9/2014 | Gast | H04L 63/0823 726/4 |
| 2014/0282951 A1* | | 9/2014 | Ranade | H04L 63/062 726/6 |
| 2014/0297820 A1* | | 10/2014 | Grubis | H04L 41/0806 709/222 |
| 2014/0298420 A1 | | 10/2014 | Barton | |
| 2014/0304808 A1 | | 10/2014 | Martini | |
| 2014/0349611 A1 | | 11/2014 | Kant | |
| 2015/0033298 A1 | | 1/2015 | Martini | |
| 2015/0082025 A1 | | 3/2015 | Deshpande | |
| 2015/0106892 A1 | | 4/2015 | Hauw | |
| 2015/0111534 A1 | | 4/2015 | Grayson | |
| 2015/0222637 A1 | | 8/2015 | Hung | |
| 2015/0296377 A1* | | 10/2015 | Sheu | H04W 12/04 380/279 |
| 2016/0012465 A1* | | 1/2016 | Sharp | G06Q 20/18 705/14.17 |
| 2016/0026776 A1 | | 1/2016 | Hurst | |
| 2016/0080343 A1 | | 3/2016 | Robinton | |
| 2016/0127352 A1 | | 5/2016 | Xu | |
| 2016/0164722 A1* | | 6/2016 | Zhu | G06F 16/27 709/221 |
| 2016/0212695 A1* | | 7/2016 | Lynch | H04W 48/08 |
| 2016/0330079 A1 | | 11/2016 | Laos | |
| 2016/0359840 A1* | | 12/2016 | Gast | H04L 63/083 |
| 2016/0366183 A1* | | 12/2016 | Smith | H04L 63/06 |
| 2017/0034160 A1 | | 2/2017 | Brands | |
| 2017/0041296 A1* | | 2/2017 | Ford | G06F 16/951 |
| 2017/0054571 A1* | | 2/2017 | Kitchen | H04L 12/2818 |
| 2017/0094509 A1 | | 3/2017 | Mistry | |
| 2017/0149784 A1 | | 5/2017 | White, Jr. | |

OTHER PUBLICATIONS

C. D. Mano and A. Striegel, "Resolving WPA limitations in SOHO and open public wireless networks," IEEE Wireless Communications and Networking Conference, 2006. WCNC 2006., Las Vegas, NV, 2006, pp. 617-622, doi: 10.1109/WCNC.2006.1683540. (Year: 2006).*

International Application No. PCT/US2017/037539, International Search Report and Written Opinion dated Sep. 22, 2017.

ExtendOffice.com, "How to Send Meeting Update to One (New) Attendee Only in Outlook?," Jan. 2014 [retrieved online at https://www.extendoffice.com/documents/outlook/2078-outlook-send-meeting-updates-to-one-person.html on Aug. 2, 2018].

* cited by examiner

SEAMLESS WIRELESS DEVICE ONBOARDING

CROSS-REFERENCE TO RELATED APPLICATIONS

This application claims priority to U.S. Provisional Patent Application No. 62/350,158, filed Jun. 14, 2016, entitled "Seamless Wireless Device Onboarding," which is incorporated by reference herein.

DETAILED DESCRIPTION

Figure 1:
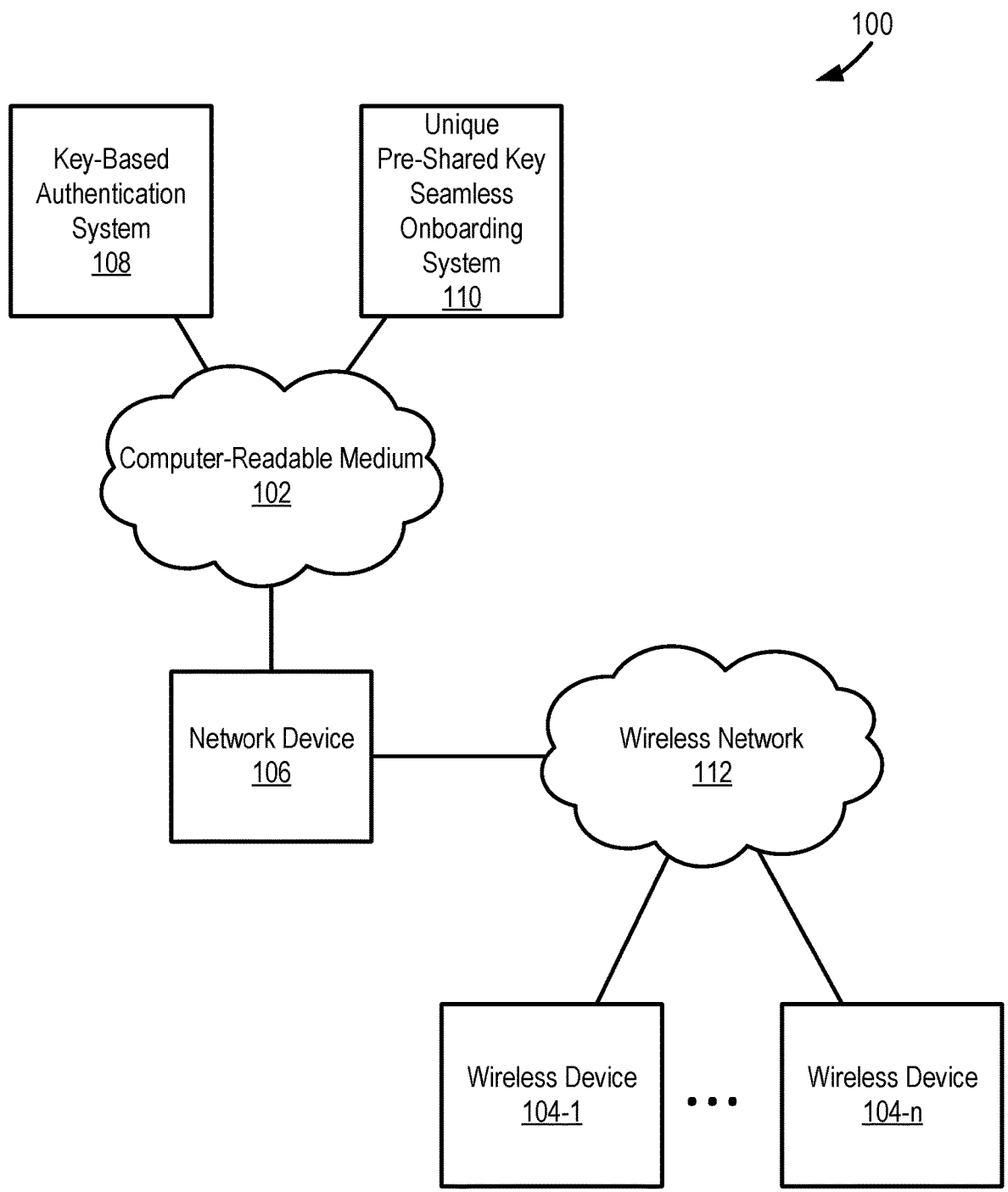
FIG. 1 depicts a diagram of an example of a system for seamlessly onboarding wireless devices for accessing a network using a unique pre-shared key.

FIG. 1 depicts a diagram 100 of an example of a system for seamlessly onboarding wireless devices for accessing a network using a unique pre-shared key. The diagram 100 includes a computer-readable medium 102, wireless device 104-1 . . . wireless device 104-n (hereinafter referred to as "wireless devices 104"), a key-based authentication system 108, and a unique pre-shared key seamless onboarding system 110. In the example system shown in FIG. 1, the wireless devices 104 are coupled to the network device 106 through the wireless network 112, and the network device 106, the key-based authentication system 108, and the unique pre-shared key seamless onboarding system 110 are coupled to each other through the computer-readable medium 102. A system similar to that illustrated in the example of FIG. 1 may or may not have multiple network devices (not shown) coupled to the computer-readable medium 102 and wireless network 112 and/or network devices (not shown) coupled to the computer-readable medium 102 and other wireless networks (not shown) that together form an extended service set (ESS) or a wireless portion of some other enterprise network.

The computer-readable medium 102 and other computer readable mediums discussed in this paper are intended to include all mediums that are statutory (e.g., in the United States, under 35 U.S.C. 101), and to specifically exclude all mediums that are non-statutory in nature to the extent that the exclusion is necessary for a claim that includes the computer-readable medium to be valid. Known statutory computer-readable mediums include hardware (e.g., registers, random access memory (RAM), non-volatile (NV) storage, to name a few), but may or may not be limited to hardware.

The computer-readable medium 102 and other computer readable mediums discussed in this paper are intended to represent a variety of potentially applicable technologies. For example, the computer-readable medium 102 can be used to form a network or part of a network. Where two components are co-located on a device, the computer-readable medium 102 can include a bus or other data conduit or plane. Where a first component is co-located on one device and a second component is located on a different device, the computer-readable medium 102 can include a wireless or wired back-end network or LAN. The computer-readable medium 102 can also encompass a relevant portion of a WAN or other network, if applicable.

The computer-readable medium 102 and other applicable systems or devices described in this paper can be implemented as a computer system or parts of a computer system or a plurality of computer systems. A computer system, as used in this paper, is intended to be construed broadly. In general, a computer system will include a processor, memory, non-volatile storage, and an interface. A typical computer system will usually include at least a processor, memory, and a device (e.g., a bus) coupling the memory to the processor. The processor can be, for example, a general-purpose central processing unit (CPU), such as a microprocessor, or a special-purpose processor, such as a microcontroller.

The memory can include, by way of example but not limitation, random access memory (RAM), such as dynamic RAM (DRAM) and static RAM (SRAM). The memory can be local, remote, or distributed. The bus can also couple the processor to non-volatile storage. The non-volatile storage is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. Some of this data is often written, by a direct memory access process, into memory during execution of software on the computer system. The non-volatile storage can be local, remote, or distributed. The non-volatile storage is optional because systems can be created with all applicable data available in memory.

Software is typically stored in the non-volatile storage. Indeed, for large programs, it may not even be possible to store the entire program in the memory. Nevertheless, it should be understood that for software to run, if necessary, it is moved to a computer-readable location appropriate for processing, and for illustrative purposes, that location is referred to as the memory in this paper. Even when software is moved to the memory for execution, the processor will typically make use of hardware registers to store values associated with the software, and local cache that, ideally, serves to speed up execution. As used herein, a software program is assumed to be stored at an applicable known or convenient location (from non-volatile storage to hardware registers) when the software program is referred to as "implemented in a computer-readable storage medium." A processor is considered to be "configured to execute a program" when at least one value associated with the program is stored in a register readable by the processor.

In one example of operation, a computer system can be controlled by operating system software, which is a software program that includes a file management system, such as a disk operating system. One example of operating system software with associated file management system software is the family of operating systems known as Windows® from Microsoft Corporation of Redmond, Wash., and their associated file management systems. Another example of operating system software with its associated file management system software is the Linux operating system and its associated file management system. The file management system is typically stored in the non-volatile storage and causes the processor to execute the various acts required by the operating system to input and output data and to store data in the memory, including storing files on the non-volatile storage.

The bus can also couple the processor to the interface. The interface can include one or more input and/or output (I/O) devices. Depending upon implementation-specific or other considerations, the I/O devices can include, by way of example but not limitation, a keyboard, a mouse or other pointing device, disk drives, printers, a scanner, and other I/O devices, including a display device. The display device can include, by way of example but not limitation, a cathode ray tube (CRT), liquid crystal display (LCD), or some other applicable known or convenient display device. The interface can include one or more of a modem or network interface. It will be appreciated that a modem or network interface can be considered to be part of the computer system. The interface can include an analog modem, isdn modem, cable modem, token ring interface, satellite transmission interface (e.g. "direct PC"), or other interfaces for coupling a computer system to other computer systems. Interfaces enable computer systems and other devices to be coupled together in a network.

The computer systems can be compatible with or implemented as part of or through a cloud-based computing system. As used in this paper, a cloud-based computing system is a system that provides virtualized computing resources, software and/or information to end user devices. The computing resources, software and/or information can be virtualized by maintaining centralized services and resources that the edge devices can access over a communication interface, such as a network. "Cloud" may be a marketing term and for the purposes of this paper can include any of the networks described herein. The cloud-based computing system can involve a subscription for services or use a utility pricing model. Users can access the protocols of the cloud-based computing system through a web browser or other container application located on their end user device.

A computer system can be implemented as an engine, as part of an engine or through multiple engines. As used in this paper, an engine includes one or more processors, at least partially implemented in hardware, or a portion thereof. A portion of one or more processors can include some portion of hardware less than all of the hardware comprising any given one or more processors, such as a subset of registers, the portion of the processor dedicated to one or more threads of a multi-threaded processor, a time slice during which the processor is wholly or partially dedicated to carrying out part of the engine's functionality, or the like. As such, a first engine and a second engine can have one or more dedicated processors or a first engine and a second engine can share one or more processors with one another or other engines. Depending upon implementation-specific or other considerations, an engine can be centralized or its functionality distributed. An engine can include software embodied in a computer-readable medium, firmware, or hardware for execution by the processor. The processor transforms data into new data using implemented data structures and methods, such as is described with reference to the FIGS. in this paper.

The engines described in this paper, or the engines through which the systems and devices described in this paper can be implemented, can be cloud-based engines. As used in this paper, a cloud-based engine is an engine that can run applications and/or functionalities using a cloud-based computing system. All or portions of the applications and/or functionalities can be distributed across multiple computing devices, and need not be restricted to only one computing device. In some embodiments, the cloud-based engines can execute functionalities and/or modules that end users access through a web browser or container application without having the functionalities and/or modules installed locally on the end-users' computing devices.

As used in this paper, datastores are intended to include repositories having any applicable organization of data, including tables, comma-separated values (CSV) files, traditional databases (e.g., SQL), or other applicable known or convenient organizational formats. Datastores can be implemented, for example, as software embodied in a physical computer-readable medium on a specific-purpose machine, in firmware, in hardware, in a combination thereof, or in an applicable known or convenient device or system. Datastore-associated components, such as database interfaces, can be considered "part of" a datastore, part of some other system component, or a combination thereof, though the physical location and other characteristics of datastore-associated components is not critical for an understanding of the techniques described in this paper.

Datastores can include data structures. As used in this paper, a data structure is associated with a particular way of storing and organizing data in a computer so that it can be used efficiently within a given context. Data structures are generally based on the ability of a computer to fetch and store data at any place in its memory, specified by an address, a bit string that can be itself stored in memory and manipulated by the program. Thus, some data structures are based on computing the addresses of data items with arithmetic operations; while other data structures are based on storing addresses of data items within the structure itself. Many data structures use both principles, sometimes combined in non-trivial ways. The implementation of a data structure usually entails writing a set of procedures that create and manipulate instances of that structure. The datastores, described in this paper, can be cloud-based datastores. A cloud-based datastore is a datastore that is compatible with cloud-based computing systems and engines.

The wireless devices 104 function according to an applicable device for sending and receiving data through a wireless network. In various implementations, the wireless devices 104 can include a communication engine configured to use a key for authenticating the wireless devices 104 for communicating through a wireless and/or backend network. Depending upon implementation-specific or other considerations, the wireless devices 104 use a unique pre-shared key for network authentication. A pre-shared key can be a key provided to a device prior to authentication using the key. As used in this paper, a unique pre-shared key is a private key used for network authentication that is uniquely associated with a set of devices. In a specific implementation, the set consists of one device. Instead or in addition, the set can consist of devices associated with a particular person, profile, or account. For example, MAC addresses of a set of devices and/or a set of persons, profiles, or accounts can be bound to a unique pre-shared key, thereby associating the device(s), person(s), profile(s), or account(s) with the unique pre-shared key. In a specific implementation, the wireless devices 104 are uniquely associated with user accounts. For example, the wireless devices 104 can be uniquely associated with respective student accounts for students in a classroom. In various implementations, the wireless devices 104 can be thin wireless devices or ultra-thin wireless devices.

In a specific implementation, the wireless devices 104 act as or include a station, by including a wireless interface through which it can be coupled through a Wi-Fi connection to a network device. A station, as used in this paper, can be referred to as a device with a media access control (MAC) address and a physical layer (PHY) interface to a wireless medium that complies with the IEEE 802.11 standard. Thus, for example, the wireless devices 104 can be referred to as a station, if applicable. IEEE 802.11a-1999, IEEE 802.11b-1999, IEEE 802.11g-2003, IEEE 802.11-2007, IEEE 802.11n TGn Draft 8.0 (2009), and IEEE 802.11ac-2013 are incorporated by reference. As used in this paper, a system that is 802.11 standards-compatible or 802.11 standards-compliant complies with at least some of one or more of the incorporated documents' requirements and/or recommendations, or requirements and/or recommendations from earlier drafts of the documents, and includes Wi-Fi systems. Wi-Fi is a non-technical description that is generally correlated with the IEEE 802.11 standards, as well as Wi-Fi Protected Access (WPA) and WPA2 security standards, and the Extensible Authentication Protocol (EAP) standard. In alternative implementations, a station may comply with a different standard than Wi-Fi or IEEE 802.11, may be referred to as something other than a "station," and may have different interfaces to a wireless or other medium.

IEEE 802.3 is a working group and a collection of IEEE standards produced by the working group defining the physical layer and data link layer's MAC of wired Ethernet. This is generally a local area network technology with some wide area network applications. Physical connections are typically made between nodes and/or infrastructure devices (hubs, switches, routers) by various types of copper or fiber cable. IEEE 802.3 is a technology that supports the IEEE 802.1 network architecture. As is well-known in the relevant art, IEEE 802.11 is a working group and collection of standards for implementing wireless local area network (WLAN) computer communication in the 2.4, 3.6 and 5 GHz frequency bands. The base version of the standard IEEE 802.11-2007 has had subsequent amendments. These standards provide the basis for wireless network products using the Wi-Fi brand. IEEE 802.1 and 802.3 are incorporated by reference.

In a specific implementation, the wireless devices 104 function to provide authentication data for use in network authentication of the wireless devices 104 through the wireless network 112. Instead or in addition, the network authentication can be at (as opposed to through) the wireless network 112. In various implementations, authentication data can include a key, data generated using a key, user data describing a user of the wireless devices 104, and/or device data, e.g. MAC addresses of the wireless devices 104. Depending upon implementation-specific or other considerations, the wireless devices 104 can provide authentication data generated using a common key for providing network access to a plurality of devices, e.g. a public pre-shared key. For example, the wireless devices 104 can use common keys, provided to the wireless devices 104 for use in receiving limited access to a network, when onboarding the wireless devices 104. Instead or in addition, the wireless devices 104 can provide authentication data generated using a unique pre-shared key. For example, the wireless devices 104 can provide corresponding unique pre-shared keys bound to the wireless devices 104 to access to a network at or through the wireless network 112.

Using keys instead of certificates reduces the complexity in onboarding a plurality of devices. For example, if a user has problems with a certificate, they have to go through the enrollment process to obtain a certificate again, which often requires assistance from network administrators. Conversely, in being key-based, if a user is experiencing problems with network authentication, a network administrator can remotely trouble-shoot a device of the user and may simply redistribute a key to the appropriate device(s). As a result, burdens on network administrators are reduced. This becomes increasingly important in situations where thousands of devices are onboarded. Using unique pre-shared keys, as opposed to pre-shared keys, as part of onboarding devices is advantageous as the greater the number of devices onboarded using a pre-shared key, the greater the chances are the pre-shared key will be compromised, e.g. used or the potential to be used to gain unauthorized access to a network.

The network device 106 functions according to applicable devices for routing, at least in part, data traffic to and from a backend of a network. In various implementations, the network device 106 includes a router, a switch, an access point, a gateway, including a wireless gateway, a repeater, or a combinations thereof. In functioning as a gateway, the network device 106 can transport data from a backend of a network to a device coupled to the network device 106. In functioning as an access point, the network device 106 can couple a device coupled to the network device 106 to a network associated with the network device 106. In various implementations, the network device 106 functions according to applicable protocols for forming part of a wireless network, including WiFi, such as the IEEE 802.11 standards.

The key-based authentication system 108 functions to authenticate devices using keys. In authenticating devices, the key-based authentication system 108 can control the transmission of data between devices and a network. For example, the key-based authentication system 108 can control communication between the Internet and the wireless devices 104 by controlling network authentication at or through the wireless network 112. In a specific implementation, the key-based authentication system 108 functions to prevent transmission of data (other than that associated with network authentication, beacon frames, or the like) over the wireless network 112 until network authentication has been successfully accomplished.

In a specific implementation, the key-based authentication system 108 can control the transmission of data based on specific network service access rights associated with a key used to authenticate a device, as indicated by key data. Data associated with network services includes parameters related to providing networking services to a wireless device, e.g. sources and destinations for communications to or from a device, types of network services a device is allowed to exploit, network access for a device, and WLANs a device can join and/or communicate through. For example, if a device is authenticating using a common key and key data indicates that network service access rights associated with the common key specify only sending and receiving data for purposes of onboarding the device using a unique pre-shared key, then the device is only allowed access to network services for that purpose. In another example, if network authentication is being performed for a device using a unique pre-shared key assigned to the device, and the unique pre-shared key is associated with specific network service to allow access to the Internet through the wireless network when the device is authenticated, then the key-based authentication system 108 can allow data to be transferred between the Internet and the device.

In a specific implementation, the key-based authentication system 108 functions to authenticate a device based on authentication data received from the device. Depending upon implementation-specific or other considerations, the key-based authentication system 108 can authenticate a device based on authentication data received from the device using a common key. For example, the key-based authentication system 108 can authenticate a device for a network using authentication data generated by the device using a common key for purposes of onboarding the wireless device with a unique pre-shared key. Further depending upon implementation-specific or other considerations, the key-based authentication system 108 can authenticate a device for a network using authentication data receiving from the device using a unique pre-shared key of the device. For example, the key-based authentication system 108 can receive a unique pre-shared key assigned to a device from the device as part of authentication data and subsequently authenticate the device to access a network using the unique pre-shared key.

In a specific implementation, the key-based authentication system 108 functions to receive a MAC address from a device for network authentication. For example, a received MAC address can be used to bind the MAC address to a unique pre-shared key assigned to a device, which can serve to prevent other devices with corresponding different MAC addresses from using the unique pre-shared key for network authentication. Depending upon implementation-specific or other considerations, the key-based authentication system 108 can receive a MAC address from a device as part of authentication data received from the device for network authentication using a common key. For example, the key-based authentication system 108 can receive a MAC address from a device during network authentication using a common key for purposes of onboarding the wireless device using a unique pre-shared key. Further depending upon implementation-specific or other considerations, the key-based authentication system 108 can receive a MAC address of a device from an application executing at the device for onboarding the device using a unique pre-shared key. For example, an application executing at a device for configuring the device to authenticate using a unique pre-shared key assigned to the device, can provide a MAC address as part of onboarding the device using the unique pre-shared key.

The unique pre-shared key seamless onboarding system 110 functions to seamlessly onboard a device using a unique pre-shared key assigned to the device. In various implementations, the unique pre-shared key seamless onboarding system 110 onboards a device seamlessly between using a common key and a unique pre-shared key assigned to the device. For example, the unique pre-shared key seamless onboarding system 110 can use a connection formed between one of the wireless devices 104 and the wireless network 112 using a common key to seamlessly send a unique pre-shared key to the wireless device absent intervention of a network administrator. In another example, the unique pre-shared key seamless onboarding system 110 can use a connection formed between one of the wireless devices 104 and the wireless network 112 using a common key to seamlessly send a configuration profile to the wireless device which can be used by an application at the wireless device to configure the wireless device to access the wireless network 112 through a unique pre-shared key absent intervention of a network administrator. A configuration profile can include a unique pre-shared key associated with a device and configuration parameters specifying how to configure one of the wireless devices to access the wireless network 112 using the unique pre-shared key.

In a specific implementation, the unique pre-shared key seamless onboarding system 110 functions to seamlessly onboard the wireless devices 104 using a unique pre-shared key while the wireless devices 104 are decoupled from the wireless network. In seamlessly onboarding the wireless devices 104 using a unique pre-shared key while the wireless devices 104 are decoupled from the wireless network 112, the unique pre-shared key seamless onboarding system 110 can onboard the wireless devices 104 absent intervention from a network administrator. In a specific implementation, the unique pre-shared key seamless onboarding system 110 sends a unique pre-shared key and/or a configuration profile to a messaging service destination associated with the wireless devices 104. For example, the unique pre-shared key seamless onboarding system 110 can send a unique pre-shared key and/or a configuration profile to an email address of a student before the student arrives at school, thereby making the unique pre-shared key available for use on a wireless device of the student. Alternatively or in addition, the unique pre-shared key seamless onboarding system 110 can provide a portal to a user through which the user can access the unique pre-shared key seamless onboarding system 110 to obtain a unique pre-shared key and/or a configuration profile. For example, the unique pre-shared key seamless onboarding system 110 can provide a web portal, accessible using a web browser, through which a person can download a unique pre-shared key and/or a configuration profile to one of the wireless devices 104 while the wireless device is decoupled from the wireless network 112.

In a specific wireless device implementation, the unique pre-shared key seamless onboarding system 110 is implemented, at least in part, through an application executing at the wireless devices 104. In a specific implementation, the unique pre-shared key seamless onboarding system 110 is implemented through an enterprise application at the wireless devices 104. An application implementing the unique pre-shared key seamless onboarding system 110 at the wireless devices 104 can receive a unique pre-shared key and/or a configuration profile at the wireless devices 104. An application implementing the unique pre-shared key seamless onboarding system 110 at the wireless devices 104 can receive a unique pre-shared key and/or a configuration profile at the wireless devices 104 when the wireless devices are coupled to the wireless network 112 whereat or wherethrough the unique pre-shared key is used for network authentication. Depending upon implementation-specific or other considerations, an application implementing the unique pre-shared key seamless onboarding system 110 at the wireless devices 104 can gather and send identification information at the wireless devices 104 for purposes of network authentication using a unique pre-shared key. Identification information includes applicable information for identifying a device or a person, profile, or account with which the device is associated. For example, identification information can include a MAC address of a device and user credentials of a person attempting network authentication with a device.

In a specific implementation, the unique pre-shared key seamless onboarding system 110 functions to assign a unique pre-shared key to the wireless devices 104 for purposes of onboarding the wireless devices 104 seamlessly onto the wireless network 112. In various implementations, the unique pre-shared key seamless onboarding system 110 can assign a unique pre-shared key to each of the wireless devices 104 so each of the wireless devices 104 has its own unique pre-shared key. In a specific implementation, the unique pre-shared key seamless onboarding system 110 can associate unique pre-shared keys with specific network service access rights. For example, the unique pre-shared key seamless onboarding system 110 can associate a unique pre-shared key assigned to a first of the wireless devices 104, where the first of the wireless devices 104 is associated with a student, with access rights specifying to only allow access to a school's intranet. In a specific implementation, the unique pre-shared key seamless onboarding system 110 can associate a unique pre-shared key with specific network service access rights based on input for a network administrator. For example, if a network administrator specifies a second of the wireless devices 104, where the second of the wireless devices 104 is associated with a teacher, should be given unlimited access through the wireless network 112, then the unique pre-shared key seamless onboarding system 110 can associate pre-shared keys of second of the wireless devices 104 with network service access rights of unlimited access.

In a specific implementation, the unique pre-shared key seamless onboarding system 110 functions to bind a MAC address of the wireless devices 104 with unique pre-shared keys associated with the respective wireless devices 104 to onboard the wireless devices 104 to access the wireless network 112. In binding a MAC address of a device with a unique pre-shared key associated with the device, network security can be managed. For example, if a device with a MAC address not matching a MAC address bound to a unique pre-shared key is attempting to access a network using the unique pre-shared key, then the key-based authentication system 108 can assume the unique pre-shared key has been compromised.

In a specific implementation, the unique pre-shared key seamless onboarding system 110 maintains key data. Key data can include specific keys, e.g. unique pre-shared keys, associated with specific devices. In a specific implementation, key data includes MAC addresses of devices bound to specific keys. In a specific implementation, key data includes network service access rights associated with specific keys. For example, if a device associated with a unique pre-shared key has unlimited network access rights, then key data can indicate the device associated with the unique pre-shared key has unlimited network access rights.

In a specific implementation, the unique pre-shared key seamless onboarding system 110 configures a device to access a network using a unique pre-shared key as part of onboarding the device. In a specific implementation, the unique pre-shared key seamless onboarding system 110 configures a device based on a configuration profile. For example, if a configuration profile indicates to configure a device according to specific values of configuration parameters, then the unique pre-shared key seamless onboarding system 110 can configure the device for network authentication using the specific values. In a specific implementation, the unique pre-shared key seamless onboarding system 110 configures the wireless devices 104 using unique pre-shared keys provided to the respective wireless devices 104. For example, the unique pre-shared key seamless onboarding system 110 can include an application on one or more of the wireless devices 104 configured to authenticate at or through the wireless network 112 via an applicable API.

In a specific implementation, the unique pre-shared key seamless onboarding system 110 functions to determine a MAC address of a device for use in binding the MAC address of the device to a unique pre-shared key. For example, the unique pre-shared key seamless onboarding system 110 can identify a MAC address of a device based on authentication data received from the device during network authentication using a common key. In a specific implementation, the unique pre-shared key seamless onboarding system 110 identifies a MAC address of a wireless device through an application at the device. For example, the unique pre-shared key seamless onboarding system 110 can be implemented as an application at the wireless devices 104 and use an API to access device information to determine a MAC address of the wireless devices 104.

In a specific implementation, the unique pre-shared key seamless onboarding system 110 functions to reassign keys for purposes of providing access to network services. In reassigning keys, the unique pre-shared key seamless onboarding system 110 can disassociate a key from a device. Further, in reassigning keys, the unique pre-shared key seamless onboarding system 110 can reassign a new key to a device after it has been disassociated from a previous key. In a specific implementation, the unique pre-shared key seamless onboarding system 110 reassigns keys based on input received from a network administrator. For example, when a network administrator determines a unique pre-shared key associated with a device has been compromised, then the unique pre-shared key seamless onboarding system 110 can assign a new unique pre-shared key to the wireless device in response to instructions received from the network administrator.

In a specific implementation, the unique pre-shared key seamless onboarding system 110 functions to receive a common key at a device for purposes of onboarding the device with a unique pre-shared key. For example, the unique pre-shared key seamless onboarding system 110 can be implemented, at least in part, as part of an application executing at the wireless device that receives a common key for initially authenticating for a wireless network. In a specific implementation, the unique pre-shared key seamless onboarding system 110 configures a device to access a network using a common key. For example, the unique pre-shared key seamless onboarding system 110 can receive a common key and/or a configuration profile at a device and configure the device to seamlessly connect to a network using the common key without configuration by a user of the device.

In an example of operation of the example system shown in FIG. 1, the wireless devices 104 establish a wireless connection to the network device 106 using a common key. For example, the key-based authentication system 108 authenticates the wireless devices 104 at or through the wireless network 112 using a common key, which results in a wireless network connection between the wireless devices 104 and the network device 106. The unique pre-shared key seamless onboarding system 110 assigns unique pre-shared keys to the wireless devices 104. It should be noted, depending upon implementation- and/or configuration-specific factors, the unique pre-shared keys may or may not be assigned in advance of the wireless network connection being established. The unique pre-shared key seamless onboarding system 110 uses the wireless network connection to seamlessly onboard the wireless devices 104 using the unique pre-shared keys.

Figure 2:
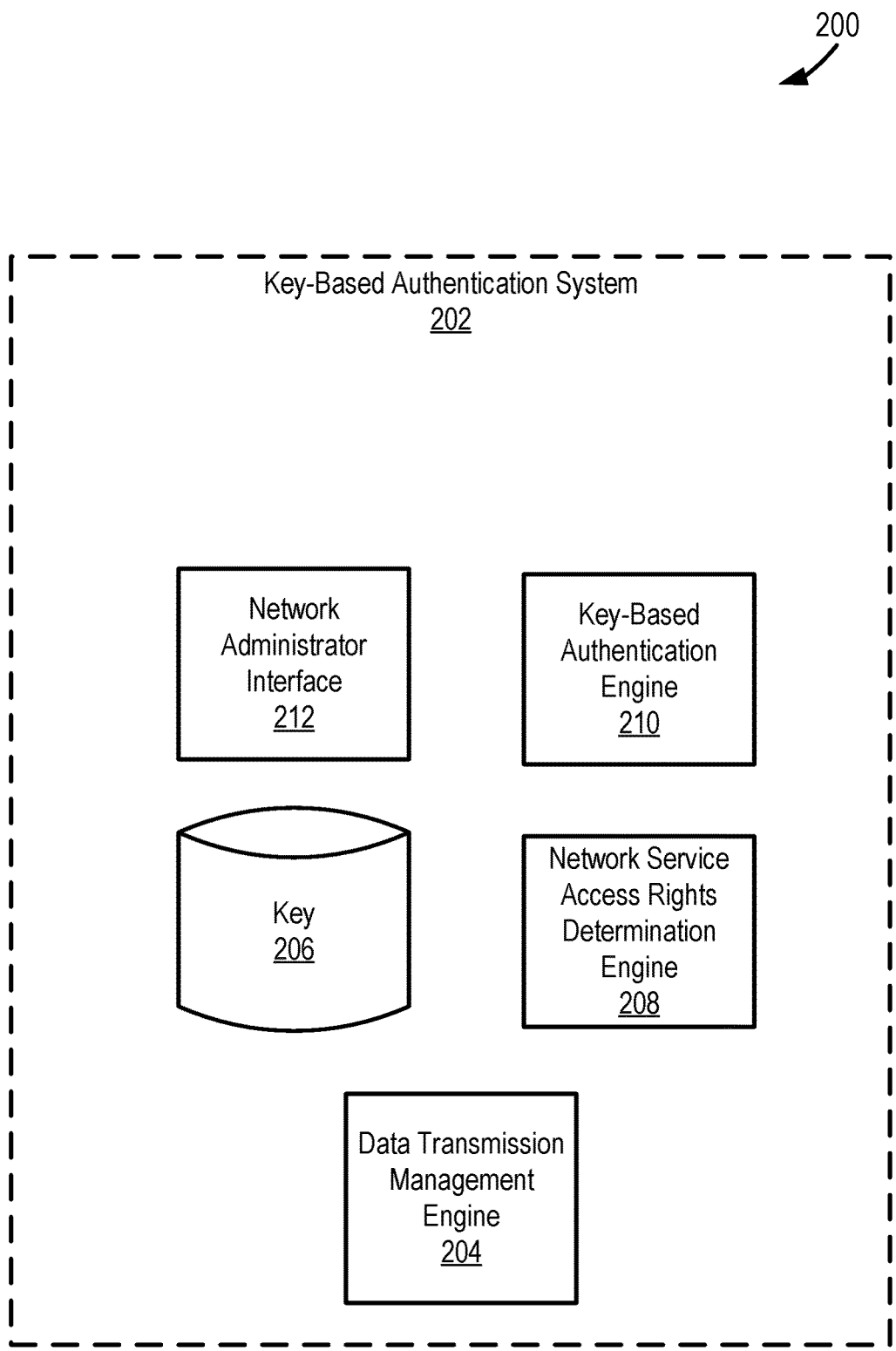
FIG. 2 depicts a diagram of an example of a key-based authentication system.

FIG. 2 depicts a diagram 200 of an example of a key-based authentication system 202. The key-based authentication system 202 functions according to an applicable system for performing key-based network authentication of devices, such as the key-based authentication systems described in this paper. As part of performing network authentication, the key-based authentication system 202 can manage device access to network services provided by or through a network. The key-based authentication system 202 can manage device access to network services based on a key being used for authentication. For example, the key-based authentication system 202 can manage device access to network services according to network service access rights associated with a key being used for authentication. In managing access to network services, the key-based authentication system 202 can control which data is transmitted to devices from sources, and which data is transmitted from devices to destinations. For example, the key-based authentication system 202 can limit communications between a device and services provided to the device via the Internet.

The key-based authentication system 202 functions to authenticate a wireless device at or through a wireless network using keys. The key-based authentication system 202 can authenticate a wireless device using authentication data generated using a common key and received from the wireless device through a wireless network. For example, the key-based authentication system 202 can authenticate a wireless device at or through a wireless network for accessing, through the wireless network, network services associated with a common key. Alternatively, the key-based authentication system 202 can authenticate a wireless device using authentication data generated using a unique pre-shared key and received from the wireless device through a wireless network. For example, the key-based authentication system 202 can authenticate a wireless device at or through a wireless network for accessing, through the wireless network, network services associated with a unique pre-shared key.

The example key-based authentication system 202 shown in FIG. 2 includes a data transmission management engine 204, a key datastore 206, a network service access rights determination engine 208, a key-based authentication engine 210, and a network administrator interface 212. The data transmission management engine 204 functions to manage the transmission of data to and from wireless devices. The data transmission engine 204 can manage transmission of data to and from wireless devices for purposes of performing key-based network authentication. For example, the data transmission engine 204 can control transmission of data to and from a wireless device as the wireless device is authenticated to access a network using a common key. Additionally, the data transmission engine 204 can manage transmission of data to and from wireless devices for purposes of seamlessly onboarding the wireless devices for accessing a network. For example, the data transmission engine 204 can limit data transmitted to a wireless device from sources outside of an enterprise network until the wireless device is seamlessly onboarded to access a network using a unique pre-shared key.

In a specific implementation, the data transmission management engine 204 functions to receive authentication data from a wireless device. Authentication data received by the data transmission management engine 204 from a wireless device can be generated from a common key. For example, authentication data received by the data transmission management engine 204 can include a pre-shared key provided to a plurality of wireless devices for purposes of authenticating the wireless devices. Alternatively, authentication data received by the data transmission management engine 204 from a wireless device can be generated from a unique pre-shared key specifically associated with the wireless device. For example, the data transmission management engine 204 can receive authentication data including a unique pre-shared key specifically assigned to a wireless device for purposes of seamlessly onboarding the wireless device for accessing a network using the unique pre-shared key.

In a specific implementation, the data transmission management engine 204 functions to manage transmission of data to and from wireless devices in accessing network services according to network service access rights. The data transmission management engine 204 can manage transmission of data to and from wireless devices in accessing network services according to network service access rights associated with a key used by the wireless device in network authentication. For example, if a wireless device is authenticated using a common key, and access rights associated with the common key indicate only allowing communication of data related to seamless onboarding with a unique pre-shared key, then the data transmission management engine 204 can block transmission of data traffic unrelated to seamless onboarding of the wireless device. In another example, if a wireless device is a student device authenticated using a unique pre-shared key and network service access rights associated with the unique pre-shared key specify limiting access to certain sites on the Internet, then the data transmission management engine 204 can block transmission of data between the wireless device and the certain sites.

The key datastore 206 functions to store key data. Key data can include keys or identifications of keys associated with wireless devices. For example, key data stored in the key datastore 206 can indicate a unique pre-shared key associated with a specific wireless device. Additionally, key data stored in the key datastore 206 can indicate MAC addresses of wireless devices bound to specific keys. For example, key data can indicate a MAC address bound to a specific unique pre-shared key. Further, key data stored in the key datastore 206 can include network access service rights associated with specific keys. For example, key data stored in the key datastore 206 can indicate that a common key grants rights to only access an enterprise network.

The network service access rights determination engine 208 functions to determine network service access rights for wireless devices. The network service access rights determination engine 208 can determine network service access rights for wireless devices based on keys used by to authenticate the wireless devices for accessing network services. For example, if a wireless device uses a unique pre-shared key to authenticate and network service access rights associated with the unique pre-shared key specify only allowing access to an enterprise network, then the network service access rights determination engine 208 can determine the wireless device only has access to network services specifically provided by the enterprise network. The network service access rights determination engine 208 can determine network service access rights of wireless devices using key data.

The key-based authentication engine 210 functions to authenticate a wireless device using keys. In authenticating a wireless device, the key-based authentication engine 210 can authenticate the wireless device based on authentication data received from the wireless device and generated using a key. The key-based authentication engine 210 can authenticate a wireless device based on authentication data generated using a common key. For example, the key-based authentication engine 210 can authenticate a wireless device based on authentication data generated using a common key, in order to allow the wireless device to access network services of a network for purposes of seamlessly onboarding the wireless device to the network using a unique pre-shared key assigned to the device. Alternatively, the key-based authentication engine 210 can authenticate a wireless device based on authentication data generated using a unique pre-shared key assigned to a wireless device through seamless onboarding of the wireless device for accessing a network.

In a specific implementation, the key-based authentication engine 210 can authenticate wireless devices using keys based on MAC addresses bound to the keys. In authenticating wireless devices based on MAC addresses bound to keys, the key-based authentication engine 210 can determine if a MAC address bound to a unique pre-shared key is a MAC address of a wireless device attempting to authenticate using the unique pre-shared key. Further, in authenticating wireless devices based on MAC addresses bound to keys, the key-based authentication engine 210 can refuse to authenticate a wireless device for a network if a MAC address of a wireless device using a specific key to authenticate does not match a MAC address bound to the specific key. For example, if a wireless device uses a key to authenticate, and a MAC address bound to the key does not match a MAC address of the wireless device, then the key-based authentication engine 210 can refuse to authenticate the wireless device. In failing to authenticate a wireless device, the key-based authentication engine 210 can instruct an applicable engine for managing data transmission to and from a wireless device through a wireless network, such as the data transmission engines described in this paper, to restrict or stop the flow of data to the wireless device as part of accessing network services provided through authentication.

In a specific implementation, the key-based authentication engine 210 functions to use key data to authenticate a wireless device. The key based-authentication engine 210 can authenticate a wireless device by querying key data to determine if a key used to generate authentication data received from the wireless device matches a key assigned to the wireless device. For example, the key-based authentication engine 210 can authenticate a wireless device if it determines, from key data, that a unique pre-shared key used to generate authentication data received from the wireless device matches a unique pre-shared key specifically associated with the wireless device. If a key associated with a wireless device, as indicated by key data, fails to match a key specifically assigned to the wireless device, then the key-based authentication engine 210 can refrain from authenticating the wireless device. Additionally, if a key associated with a wireless device, as indicated by key data, fails to match a key specifically assigned to the wireless device, then the key-based authentication engine 210 can cause the wireless device to resend authentication data for purposes of trying to authenticate the wireless device again.

The network administrator interface 212 functions as a communication interface through which the key-based authentication system 202 can communicate with network administrators. Through the network administrator interface 212, a network administrator can be queried regarding a failed authentication of a wireless device. The network administrator interface 212 can be used by the network administrator to send instructions indicating to resend a key to a wireless device. For example, if a wireless device fails to initially authenticate using a common key, then a network administrator can provide through the network administrator interface 212 instructions to an applicable engine for communicating with a wireless device, such as the data transmission management engines described in this paper, to resend the common key to the wireless device.

In an example of operation of the example system shown in FIG. 2, the data transmission management engine 204 receives authentication data generated using a common key from a wireless device. In the example of operation of the example system shown in FIG. 2, the key-based authentication engine 210 authenticates the wireless device for accessing network services provided by or through a network, at or through a wireless network. Further, in the example of operation of the example system shown in FIG. 2, the network services access rights determination engine 208 determines network service access rights for the wireless device in accessing the network services provided by or through the network based on the common key and key data stored in the key datastore 206. In the example of operation of the example system shown in FIG. 2, the data transmission engine 204 controls the flow of data to and from the wireless device as the wireless device is seamlessly onboarded using a unique pre-shared key as part of accessing the network services provided by or through the network according to the network service access rights determined by the network service access rights determination engine 208.

Figure 3:
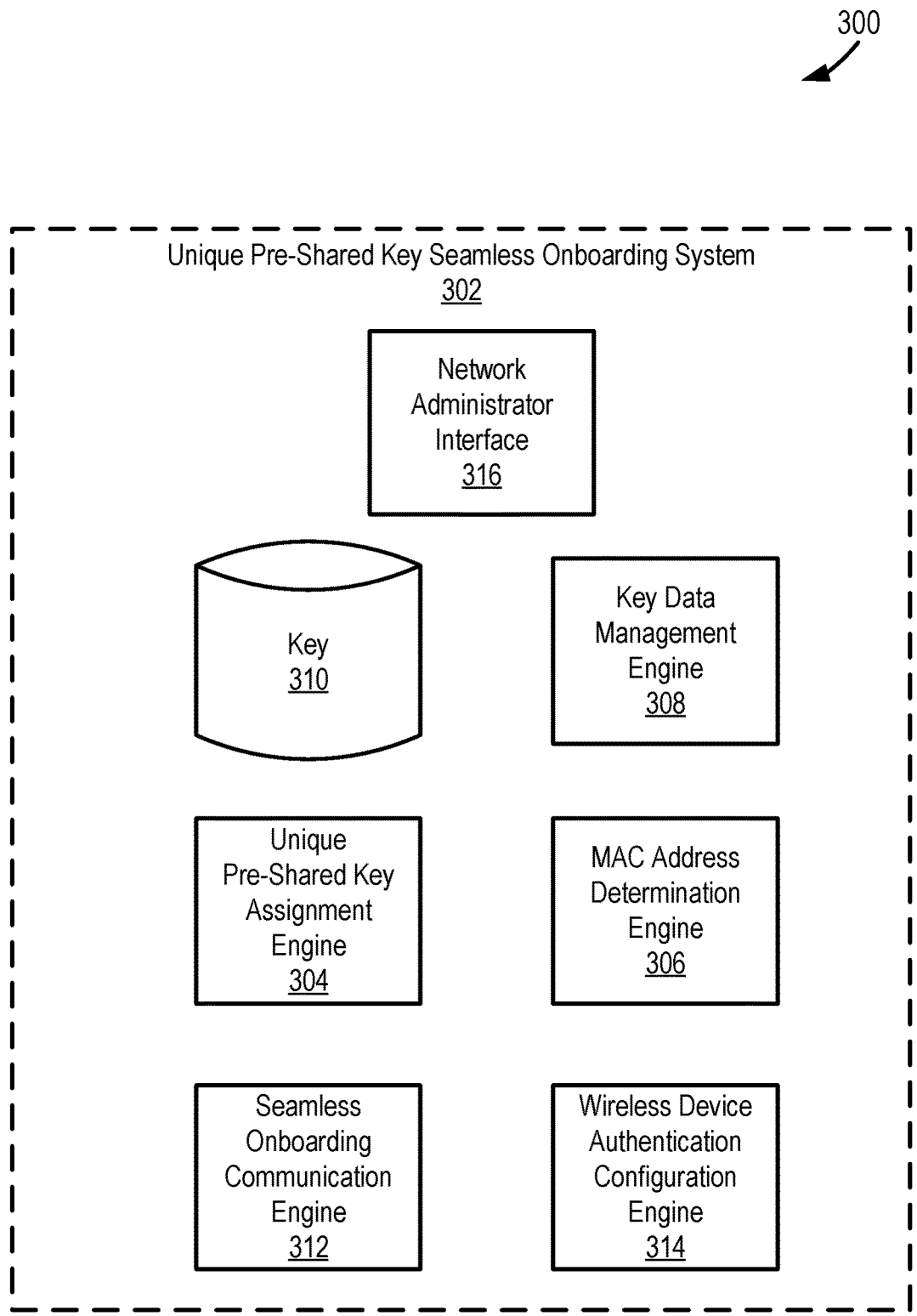
FIG. 3 depicts a diagram of an example of a unique pre-shared key seamless onboarding system for seamlessly onboarding wireless devices using a unique pre-shared key.

FIG. 3 depicts a diagram 300 of an example of a unique pre-shared key seamless onboarding system 302 for seamlessly onboarding wireless devices using a unique pre-shared key. The unique pre-shared key seamless onboarding system 302 shown in FIG. 3 functions according to an applicable system for seamlessly onboarding wireless devices for accessing a network using a unique pre-shared key, such as the unique pre-shared key seamless onboarding systems described in this paper. The unique pre-shared key seamless onboarding system 302 can be implemented, at least in part, at a wireless device. For example, the unique pre-shared key seamless onboarding system 302 can be implemented, at least in part, as a native application executing at a wireless device and/or a web-based application accessed through a web browser executing at the wireless device. Alternatively, the unique pre-shared key seamless onboarding system 302 can be implemented, at least in part, remote from a wireless device. For example, the unique pre-shared key seamless onboarding system 302 can be implemented as part of a cloud based system remote from a wireless device and configured to seamlessly onboard the wireless device for accessing a network using a unique pre-shared key.

The unique pre-shared key seamless onboarding system 302 functions to onboard a wireless device to access a network at or through a wireless network using a unique pre-shared key. In onboarding a wireless device to access a wireless network the unique pre-shared key seamless onboarding system 302 can uniquely assign a unique pre-shared key to a wireless device so that the unique pre-shared key is not shared by other wireless devices for authenticating for a wireless network. Additionally, in onboarding a wireless device to access a network, the unique pre-shared key seamless onboarding system 302 can provide a unique pre-shared key to a wireless device and configure the wireless device to authenticate using the unique pre-shared key. For example, the unique pre-shared key seamless onboarding system 302 can provide a unique pre-shared key to a portion of the unique pre-shared key seamless onboarding system 302 implemented through an application executing at a wireless device, and subsequently configure the unique pre-shared key seamless onboarding system 302 to authenticate using the provided unique pre-shared key. Alternatively, the unique pre-shared key seamless onboarding system 302 can provide a unique pre-shared key to a wireless device, where a user can use the provided unique pre-shared key to configure the wireless device to authenticate for accessing a network. For example, the unique pre-shared key seamless onboarding system 302 can send a unique pre-shared key to a wireless device where it is displayed for a user, and the user can subsequently input the unique pre-shared key for purposes of network authentication.

In a specific implementation, the unique pre-shared key seamless onboarding system 302 functions to seamlessly onboard a wireless device to access a network using a unique pre-shared key at or through a wireless network. For example, while a wireless device is coupled to a wireless network, the unique pre-shared key seamless onboarding system 302 can provide a unique pre-shared key to the wireless device through the wireless network. The unique pre-shared key seamless onboarding system 302 can seamlessly onboard a wireless device to access a wireless network over a connection formed between the wireless device and the wireless network from authenticating the wireless device using a common key. For example, a wireless device can authenticate using a public pre-shared key to access network services through a wireless network which include onboarding the wireless device to access a network using a unique pre-shared key.

In a specific implementation, the unique pre-shared key seamless onboarding system 302 functions to seamlessly onboard a wireless device to access a network using a unique pre-shared key when the wireless device is decoupled from a wireless network. For example, the unique pre-shared key seamless onboarding system 302 can provide and/or configure a wireless device when a wireless device is coupled to another network. In another example, the unique pre-shared key seamless onboarding system 302 can provide a unique pre-shared key to a wireless device for authenticating to access network services provided by or through an enterprise network of a school, while the wireless device is coupled to a home network of a user.

The example unique pre-shared key seamless onboarding system 302 shown in FIG. 3 includes a unique pre-shared key assignment engine 304, a MAC address determination engine 306, a key data management engine 308, a key datastore 310, a seamless onboarding communication engine 312, a wireless device authentication configuration engine 314, and a network administrator interface 316. The unique pre-shared key assignment engine 304 functions to assign a unique pre-shared key to a wireless device for onboarding the wireless device to access a network using the unique pre-shared key. The unique pre-shared key assignment engine 304 can assign a plurality of wireless devices different unique pre-shared keys such that each unique pre-shared key is only used by a single wireless device in authentication. The unique pre-shared key assignment engine 304 can assign a unique pre-shared key to a wireless device seamlessly without being instructed to do so by a network administrator.

In a specific implementation, the unique pre-shared key assignment engine 304 functions to bind a MAC address of a wireless device to a unique pre-shared key assigned to the wireless device. A unique pre-shared key can have only one MAC address bound to it, corresponding to a single wireless device assigned to the unique pre-shared key. In binding a MAC address to a unique pre-shared key assigned to a wireless device, security of a network and/or wireless network can be managed. For example, if a wireless device with a MAC address different from a MAC address bound to a unique pre-shared key attempts to authenticate to access network services using the unique pre-shared key, then it can be determined that the unique pre-shared key is compromised, and appropriate actions can subsequently be taken.

In a specific implementation, the unique pre-shared key assignment engine 304 functions to disassociate a wireless device from a unique pre-shared key assigned to the wireless device. The unique pre-shared key assignment engine 304 can disassociate a unique pre-shared key from an assigned wireless device if the unique pre-shared key is used by another wireless device to authenticate for a wireless network. Alternatively, the unique pre-shared key assignment engine 304 can disassociate a unique pre-shared key from a wireless device based on instructions received from a network administrator. In response to disassociating a unique pre-shared key form a wireless device, the unique pre-shared key assignment engine 304 can associate the wireless device with a new unique pre-shared key after disassociating the wireless device from the old unique pre-shared key. The process of associating a wireless device with a new unique pre-shared key can be part of a process of onboarding the wireless device again to use the new unique pre-shared key in accessing a wireless network.

In a specific implementation, the unique pre-shared key assignment engine 304 functions to generate a configuration profile for use in configuring a wireless device to authenticate using a unique pre-shared key. The unique pre-shared key assignment engine 304 can generate a configuration profile based on characteristics of a wireless device, characteristics of a user of a wireless device, characteristics of a wireless network for which the wireless device is being configured to access, and/or network service access associated with a unique pre-shared key assigned to a wireless device. Additionally, the unique pre-shared key assignment engine 304 can generate a configuration profile based on input received from a network administrator. For example, if a network administrator indicates all wireless devices of a specific type should be configured according to a specific configuration parameter, then the unique pre-shared key assignment engine 304 can generate a configuration profile including the specific configuration parameter for a wireless device of the specific type.

The MAC address determination engine 306 functions to determine a MAC address of a wireless device for purposes of seamlessly onboarding the wireless device for a wireless network using a unique pre-shared key. A MAC address of a wireless device determined by the MAC address determination engine 306 can be used to bind a unique pre-shared key to the MAC address of the wireless device. The MAC address determination engine 306 can determine a MAC address of a wireless device based on authentication of the wireless device for a wireless network using a common key for purposes of onboarding the wireless device using a unique pre-shared key. For example, the MAC address determination engine 306 can determine a MAC address of a wireless device from authentication data generated by the wireless device using a common key to gain access to a network for purposes of onboarding the wireless device using a unique pre-shared key.

In a specific implementation, the MAC address determination engine 306 functions to determine a MAC address of a wireless device using an application executing at a wireless device. The MAC address determination engine 306 can use an applicable application for configuring or managing network access at a wireless device to determine a MAC address of the wireless device. For example, the MAC address determination engine 306 can instruct or control an application for configuring a wireless device at the wireless device to access a network through an API to determine a MAC address of the wireless device.

The key data management engine 308 functions to manage key data for use in seamlessly onboarding a wireless device to access a network using a unique pre-shared key. In managing key data, the key data management engine 308 can generate and/or update key data. For example, the key data management engine 308 can update key data to indicate a unique pre-shared key assigned to a wireless device. In another example, the key data management engine 308 can update key data to indicate an old unique pre-shared key has been disassociated from a wireless device and a new unique pre-shared key has been associated with the wireless device. The key data management engine 308 can update key data to indicate a MAC address bound to a unique pre-shared key.

In a specific implementation, the key data management engine 308 can manage key data to indicate network service access rights associated with specific keys. In managing key data to indicate network service access rights, the key data management engine 308 can manage key data to indicate network service access rights associated with a common key and/or a unique pre-shared key. The key data management engine 308 can manage key data to indicate network service access rights based on input received from a network administrator. For example, if a network administrator indicates that authentication with a common key only allows access to network services provided by an enterprise network, then the key data management engine 308 can update key data to indicate network service access rights associated with the common key include enterprise network access.

The key datastore 310 functions according to an applicable datastore for storing key data, such as the key datastores described in this paper. Key data stored in the key datastore 310 can include keys associated with wireless devices. For example, key data stored in the key datastore 310 can indicate a unique pre-shared key associated with a specific wireless device. Additionally, key data stored in the key datastore 310 can indicate MAC addresses of wireless devices bound to specific keys. Further, key data stored in the key datastore 310 can include network service access rights associated with specific keys.

The seamless onboarding communication engine 312 functions to communicate with a wireless device for purposes of seamlessly onboarding a wireless device to access a network using a unique pre-shared key. In communicating with a wireless device for purposes of seamless onboarding, the seamless onboarding communication engine 312 can provide a portal through which a user of the wireless device can access and/or download a unique pre-shared key as part of seamlessly onboarding the wireless device. For example, the seamless onboarding communication engine 312 can provide a portal that a user can access through a web browser executing at a wireless device and subsequently download or view a unique pre-shared key associated with the wireless device. Alternatively, the seamless onboarding communication engine 312 can provide a unique pre-shared key to a wireless device through a messaging service. For example, the seamless onboarding communication engine 312 can email a unique pre-shared key to a user of a wireless device.

In a specific implementation, the seamless onboarding communication engine 312 functions to directly send a unique pre-shared key to a wireless device as part of seamlessly onboarding the wireless device using the unique pre-shared key. For example, the seamless onboarding communication engine 312 can send a unique pre-shared key to an application executing at a wireless device and implementing, at least in part, the unique pre-shared key seamless onboarding system 302 at the wireless device. Additionally, the seamless onboarding communication engine 312 can display a unique pre-shared key assigned to the wireless device at the wireless device. For example, the seamless onboarding communication engine 312 can display a unique pre-shared key at a wireless device to a user, who can then input the unique pre-shared key for purposes of authenticating the wireless device using the unique pre-shared key.

In a specific implementation, the seamless onboarding communication engine 312 functions to communicate with a wireless device for purposes of onboarding a wireless device to access a network through a wireless network using a unique pre-shared key when the wireless device is decoupled from the wireless network. For example, the seamless onboarding communication engine 312 can provide a web-based portal through which a user can download a unique pre-shared key when a wireless device is decoupled from a wireless network. In another example, the seamless onboarding communication engine 312 can send a unique pre-shared key to a wireless device when the wireless device is coupled to a second network different from a wireless network.

In a specific implementation, the seamless onboarding communication engine 312 functions to provide a configuration profile to a wireless device for purposes of seamlessly onboarding the wireless device to access a network using a unique pre-shared key. The seamless onboarding communication engine 312 can send a configuration profile to a wireless device or provide a portal through which a user of the wireless device can access and/or download a configuration profile. Alternatively, the seamless onboarding communication engine 312 can provide a configuration profile to a wireless device for purposes of seamlessly onboarding the wireless device to access a network through a wireless network, when the wireless device is decoupled from the wireless network.

The wireless device authentication configuration engine 314 functions to configure a device to authenticate using a unique pre-shared key. In configuring a wireless device to authenticate, the wireless device authentication configuration engine 314 can configure the wireless device using a unique pre-shared key assigned to the wireless device and/or a configuration profile generated for the wireless device. The wireless device authentication configuration engine 314 can be implemented, at least in part, through an application executing at a wireless device and organized to configure the wireless device to authenticate using a unique pre-shared key. The wireless device authentication configuration engine 314 can function to instruct or control an applicable application for configuring a wireless device to authenticate for a network to configure the wireless device to authenticate using a unique pre-shared key. Additionally, the wireless device authentication configuration engine 314 can instruct an application through an API to configure a wireless device to authenticate using a unique pre-shared key, without intervention from a network administrator.

The network administrator interface 316 functions as a communication interface through which the unique pre-shared key seamless onboarding system 302 can communicate with network administrators. Through the network administrator interface 316, a network administrator can provide instructions regarding seamless onboarding of wireless devices for accessing a wireless network using a unique pre-shared key. For example, a network administrator can provide, through the network administrator interface 316, instructions indicating which wireless devices to seamlessly onboard for a network using a unique pre-shared key. Additionally, a network administrator can provide network service access rights instructions through the network administrator interface 316, for use in managing network service access rights associated with specific keys. For example, a network administrator can set network service access rights for a specific unique pre-shared key as unlimited access by providing network service access rights instructions through the network administrator interface 316. An applicable engine for managing network service access rights, such as the key data management engines described in this paper, can manage network service access rights according to network service access rights instructions.

In a specific implementation, the network administrator interface 316 functions to be used by a network administrator to provide disassociation instructions. Disassociation instructions can indicate to disassociate a key from a wireless device and/or network service access rights from a key. For example, disassociation instructions can indicate to disassociate a unique pre-shared key assigned to a wireless device from the wireless device. Disassociation instructions can be generated and carried out in response to a key being compromised. For example, if a wireless device with a MAC address unbound to a unique pre-shared key attempts to authenticate for a wireless network using the unique pre-shared key, indicating the key has been compromised, then disassociation instructions can be generated and carried out to cause the key to be disassociated from a wireless device. Further, disassociation instructions can specify to reassign a unique pre-shared key to a wireless device.

In an example of operation of the example system shown in FIG. 3, the unique pre-shared key assignment engine 304 assigns a unique pre-shared key to a wireless device for seamlessly onboarding the wireless device to access a network. In the example of operation of the example system shown in FIG. 3, the unique pre-shared key assignment engine 304 assigns the unique pre-shared key to the wireless device when the wireless device is connected to the wireless network and accessing network services the wireless device has been authenticated for using a common key. Further, in the example of operation of the example system shown in FIG. 3, the MAC address determination engine 306 determines a MAC address of the wireless device based on the authentication of the wireless device using the common key. In the example of operation of the example system shown in FIG. 3, the unique pre-shared key assignment engine 304 binds the MAC address of the wireless determined by the MAC address determination engine 306 to the unique pre-shared key. Additionally, in the example of operation of the example system shown in FIG. 3, the key data management engine 308 updates key data stored in the key datastore 310 to indicate the MAC address bound to the unique pre-shared key.

In the example of operation of the example system shown in FIG. 3, the seamless onboarding communication engine 312 provides the unique pre-shared key to the wireless device as part of the network services the wireless device is authorized to access using the common key. Further, in the example of operation of the example system shown in FIG. 3, the wireless device authentication configuration engine 314 configures the wireless device to authenticate using the unique pre-shared key. In the example of operation of the example system shown in FIG. 3, a network administrator provides, through the network administrator interface 316, network service access rights instructions specifying network service access rights associated with the unique pre-shared key. Additionally, in the example of operation of the example system shown in FIG. 3, the key data management engine 308 updates key data stored in the key datastore 310 to associate the network service access rights, indicated by the network service access rights instructions received through the network administrator interface 316, with the unique pre-shared key.

Figure 4:
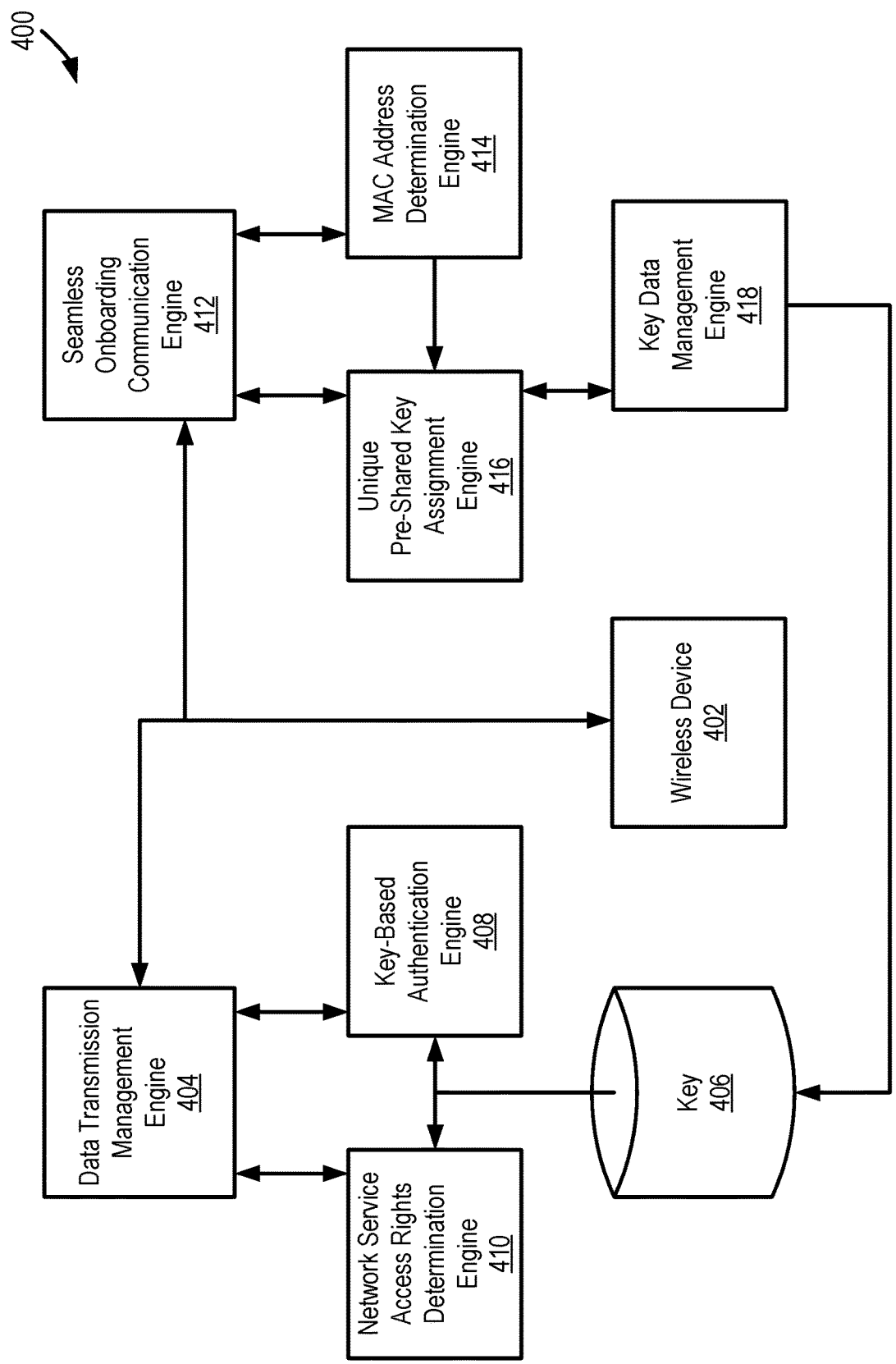
FIG. 4 depicts a diagram of an example of a system for seamlessly onboarding a wireless device for accessing a network using a unique pre-shared key.

FIG. 4 depicts a diagram 400 of an example of a system for seamlessly onboarding a wireless device 402 for accessing a network using a unique pre-shared key. The example system shown in FIG. 4 includes a data transmission management engine 404, a key datastore 406, a key-based authentication engine 408, a network service access rights determination engine 410, a seamless onboarding communication engine 412, a MAC address determination engine 414, a unique pre-shared key assignment engine 416, and a key data management engine 418.

The wireless device 402 functions according to an applicable device for sending and receiving data through a wireless network, such as the wireless devices described in this paper. The wireless device 402 can generate authentication data from keys and provide the authentication data for purposes of authenticating the wireless device 402. For example, the wireless device 402 can generate authentication data using a public unique pre-shared key provided to the wireless device. In another example, the wireless device 402 can generate authentication data using a unique pre-shared key provided to the wireless device 402 and specifically associated with the wireless device 402.

The data transmission management engine 404 functions according to an applicable engine for controlling the transmission of data to and from a wireless device for purposes of seamlessly onboarding the wireless device to access a network using a unique pre-shared key, such as the data transmission management engines described in this paper. The data transmission management engine 404 can receive authentication data from the wireless device 402 for purposes of authenticating the wireless device 402 to access network services provided by or through a network. The data transmission management engine 404 can receive authentication data from the wireless device 402 generated using a public pre-shared key. A public pre-shared key used to generate authentication data received by the data transmission engine 404 can be provided to a wireless device before the wireless device 402 is physical located on premises to access a wireless network. For example, a public pre-shared key can be loaded onto a student's device before the student arrives at school to access a network of the school through a wireless network.

The key datastore 406 functions according to an applicable datastore for storing key data, such as the key datastores described in this paper. Key data stored in the key datastore 406 can include keys associated with wireless devices. For example, key data stored in the key datastore 406 can indicate a unique pre-shared key associated with a specific wireless device. Additionally, key data stored in the key datastore 406 can indicate MAC addresses of wireless devices bound to specific keys. Further, key data stored in the key datastore 406 can include network access service rights associated with specific keys.

The key-based authentication engine 408 functions according to an applicable engine for authenticating a wireless device using a unique pre-shared key associated with the wireless device, such as the key-based authentication engines described in this paper. The key-based authentication engine 408 can authenticate the wireless device 402 based on the authentication data generated at the wireless device 402 using a public pre-shared key and received by the data transmission management engine 404. The key-based authentication engine 408 can authenticate the wireless device 402 based on the authentication data using the key data stored in the key datastore 406 by checking the key data to ensure the public pre-shared key is a valid key for accessing network services provided by or through the network. In authenticating the wireless device 402, the wireless device 402 can gain access to network services.

The network service access rights determination engine 410 functions according to an applicable engine for determining network service access rights for wireless devices during seamless onboarding of the wireless devices using unique pre-shared keys, such as the network service access rights determination engines described in this paper. The network service access rights determination engine 410 can determine network services access rights for the wireless device 402 based on the public pre-shared key used to generate the authentication data used in authenticating the wireless device 402. Network service access rights determined by the network service access rights determination engine 410 can indicate the network services the wireless device 402 gains access to based on authentication using the public pre-shared key. The network services can include services in seamless onboarding of the wireless device 402 using a unique pre-shared key. The data transmission management engine 404 can control what data is transmitted to and from the wireless device 402 at or through the wireless network according to the network service access rights of the wireless device 402, as determined by the network service access rights determination engine 410.

The seamless onboarding communication engine 412 functions according to an applicable engine for communicating with a wireless device as part of seamlessly onboarding the wireless device to access a wireless network using a unique pre-shared key, such as the seamless onboarding communication engines described in this paper. The seamless onboarding communication engine 412 can determine the wireless device 402 has gained access to the network services through authentication using the public pre-shared key, and subsequently begin onboarding the wireless device 402 for the wireless network using a unique pre-shared key. The seamless onboarding communication engine 412 can communicate with the wireless device 402 for purposes of seamlessly onboarding the wireless device 402 using a wireless connection between the wireless network and the wireless device 402.

The MAC address determination engine 414 functions according to an applicable engine for determining a MAC address of a wireless device as part of seamlessly onboarding the wireless device to access a network using a unique pre-shared key, such as the MAC address determination engines described in this paper. The MAC address determination engine 414 can determine a MAC address of the wireless device 402 from the authentication data received by the data transmission management engine 404 and used in authenticating the wireless device 402 using the public pre-shared key. The MAC address determination engine 414 can determine a MAC address of the wireless device 402 through an applicable application executing at the wireless device, e.g. an application for onboarding the wireless device 402.

The unique pre-shared key assignment engine 416 functions according to an applicable engine for assigning a unique pre-shared key to a wireless device as part of seamlessly onboarding the wireless device using a unique pre-shared key, such as the unique pre-shared key assignment engines described in this paper. The unique pre-shared key assignment engine 416 can assign a unique pre-shared key to the wireless device based the wireless device 402 gaining access to the network services including a service of seamless onboarding with a unique pre-shared key. As part of assigning a unique pre-shared key to the wireless device 402, the unique pre-shared key assignment engine 416 can bind the MAC address of the wireless device 402 determined by the MAC address determination engine 414 to a unique pre-shared key assigned to the wireless device 402. Further, the unique pre-shared key assignment engine 416 can provide a unique pre-shared key assigned to the wireless device 402 to the seamless onboarding communication engine 412 which can provide or facilitate providing of the unique pre-shared key to the wireless device 402, e.g. through a wireless network.

The key data management engine 418 functions according to an applicable engine for managing key data used in seamlessly onboarding a wireless device to access a network with a unique pre-shared key, such as the key data management engines described in this paper. The key data management engine 418 can update key data stored in the key datastore 406 to indicate the unique pre-shared key is assigned to the wireless device 402 and the MAC address of the wireless device 402 is bound to the unique pre-shared key. Additionally, the key data management engine 418 can update key data stored in the key datastore 406 to indicate network service access rights associated with the unique pre-shared key.

The wireless device 402 can provide authentication data generated using the unique pre-shared key to the data transmission management engine 404 for purposes of authenticating the wireless device 402 to access network services associated with the unique pre-shared key. The key-based authentication engine 408 can subsequently authenticate the wireless device 402 based on the unique pre-shared key using the key data stored in the key datastore 406 if the key data indicates the unique pre-shared key is associated with the wireless device 402. Data transmitted to and from the wireless device 402 can be managed according to network service access rights associated with the unique pre-shared key, as indicated by the key data stored in the key datastore 406.

Figure 5:
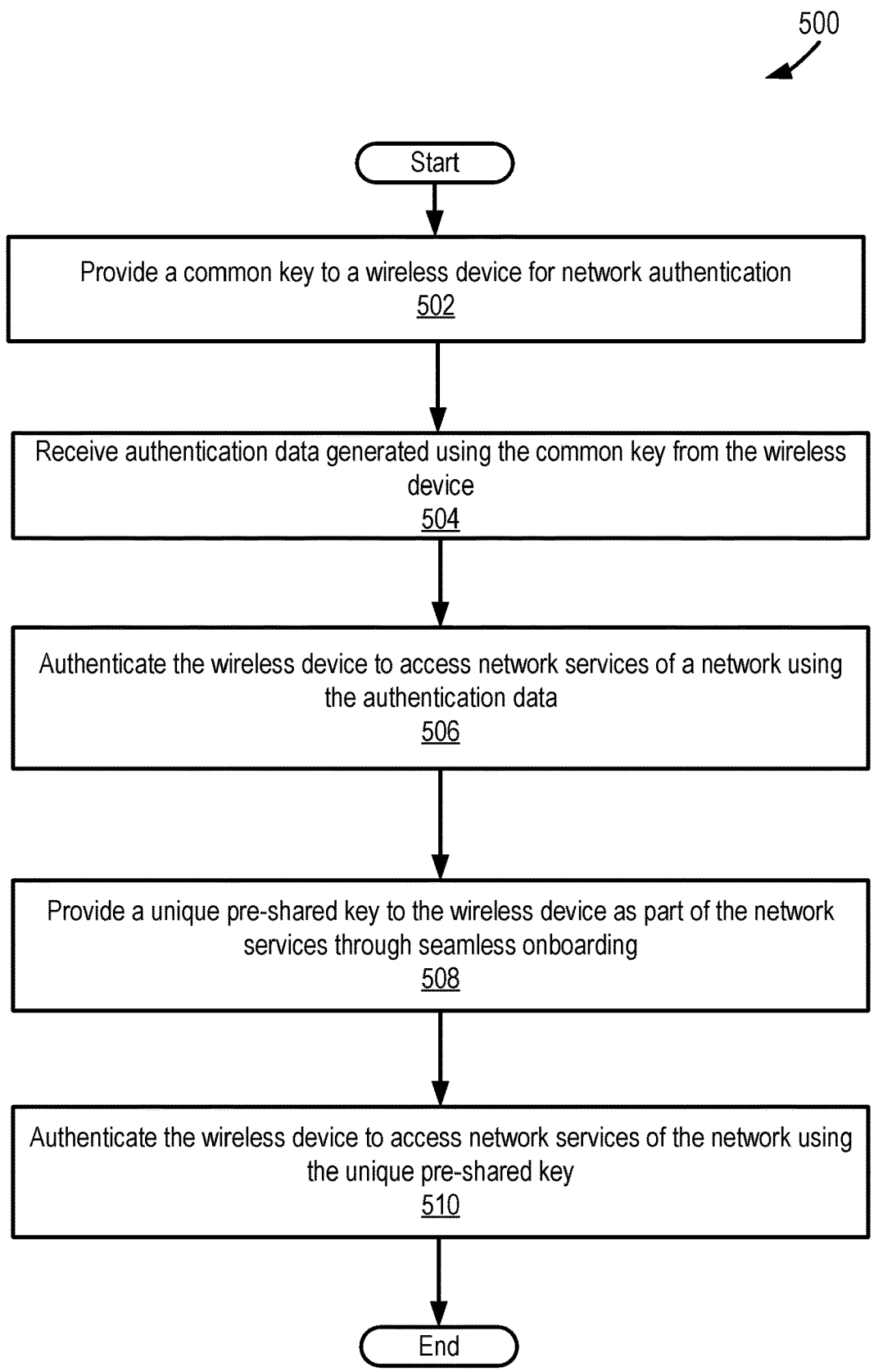
FIG. 5 depicts a flowchart of an example of a method for seamlessly onboarding a wireless device using a unique pre-shared key.

FIG. 5 depicts a flowchart 500 of an example of a method for seamlessly onboarding a wireless device using a unique pre-shared key. The flowchart 500 begins at module 502 where a common key is provided to a wireless device for network authentication purposes. An applicable engine for communicating with a wireless device for purposes of seamlessly onboarding a wireless device to access a network using a unique pre-shared key, such as the seamless onboarding communication engines described in this paper, can provide to a wireless device a common key. A common key can be provided to a wireless device before the wireless device is moved on premises to access a network through a wireless network.

The flowchart 500 continues to module 504, where authentication data generated using the common key is received from the wireless device. An applicable engine for communicating with a wireless device for purposes of authenticating a wireless device, such as the data transmission management engines described in this paper, can receive authentication data generated using the common key from the wireless device. Authentication data received from the wireless device can include the common key.

The flowchart 500 continues to module 506, where the wireless device is authenticated using the authentication data to gain access to network services of a network. An applicable engine for authenticating a wireless device to access gain access to network services of a network using a unique pre-shared key, such as the key-based authentication engines described in this paper, can authenticate the wireless device using the authentication data. Key data can be used to authenticate the wireless device for the wireless network based on authentication data generated using the common key. For example, key data can be checked to determine whether the common key is a valid key for network authentication.

The flowchart 500 continues to module 508, where a unique pre-shared key is provided to the wireless device through seamless onboarding as part of the network services accessed by the wireless device through authentication using the common key. In seamlessly onboarding the wireless device using a unique pre-shared key, a unique pre-shared key can be assigned to the wireless device. An applicable engine for assigning a unique pre-shared key as part of seamless onboarding, such as the unique pre-shared key assignment engines described in this paper, can assign a unique pre-shared key to the wireless device. Additionally, in seamlessly onboarding the wireless device for the wireless network using a unique pre-shared key, a unique pre-shared key assigned to the wireless device can be provided to the wireless device. An applicable engine for communicating with a wireless device as part of seamlessly onboarding the wireless device for accessing a network, such as the seamless onboarding communication engines described in this paper, can provide a unique pre-shared key to the wireless device.

The flowchart 500 continues to module 510, where the wireless device is authenticated to access network services of the network using the unique pre-shared key. An applicable engine for authenticating a wireless device using a unique pre-shared key, such as the key-based authentication engines described in this paper, can authenticate the wireless device for using the unique pre-shared key. The wireless device can be authenticated to access network services of the network using authentication data generated using the unique pre-shared key.

Figure 6:
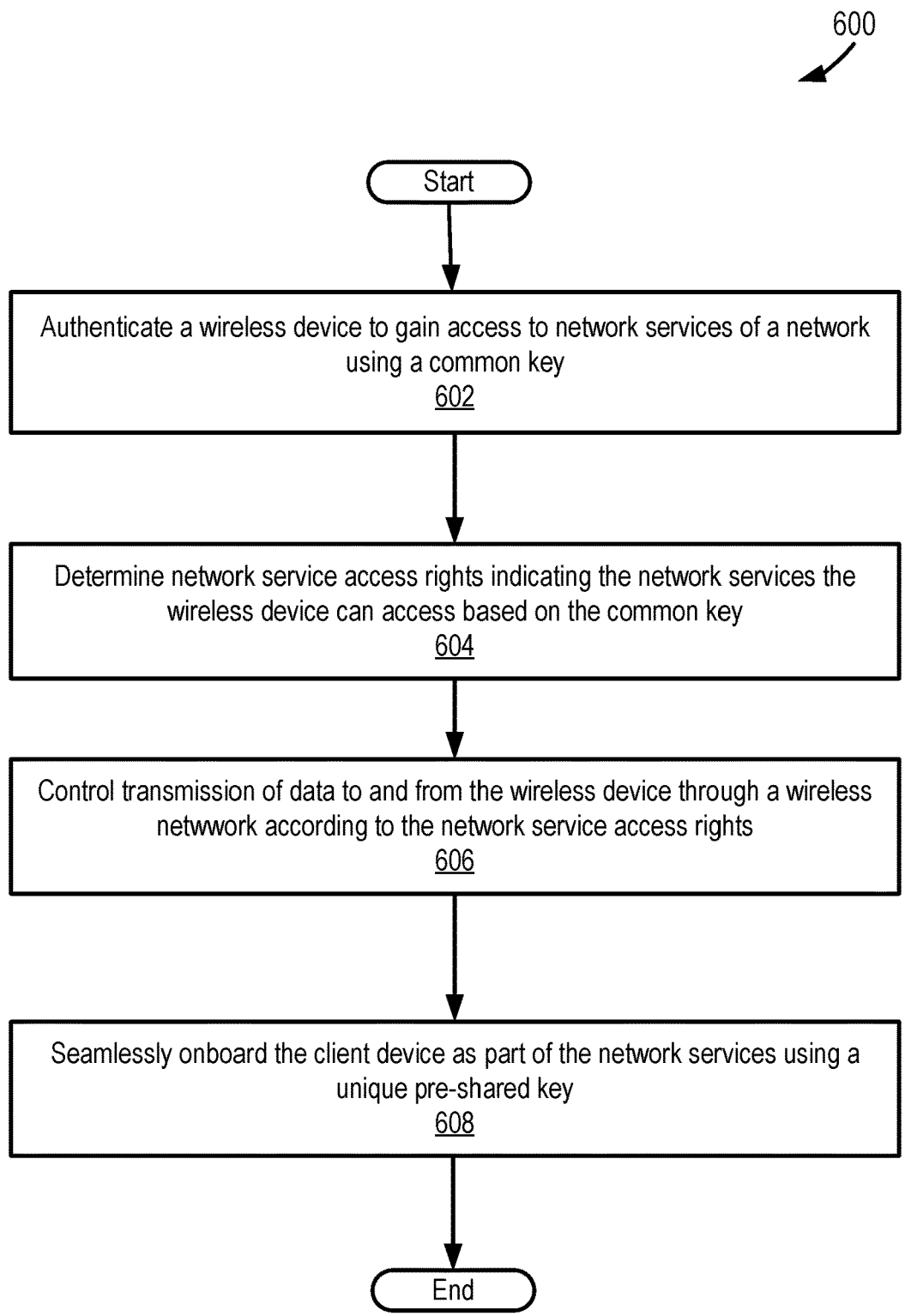
FIG. 6 depicts a flowchart of an example of a method for seamlessly onboarding a wireless device based on network services access rights using a unique pre-shared key.

FIG. 6 depicts a flowchart 600 of an example of a method for seamlessly onboarding a wireless device based on network services access rights using a unique pre-shared key. The flowchart 600 begins at module 602, where a wireless device is authenticated using a common key to gain access to network services of a network. An applicable engine for authenticating a wireless device using a unique pre-shared key, such as the key-based authentication engines described in this paper, can authenticate the wireless device based on the common key. In authenticating a wireless device, key data can be used to authenticate a wireless device based on the common key. For example, key data can be checked to determine whether the common key is a valid key for authenticating for the wireless network.

The flowchart 600 continues to module 604, where network service access rights indicating the network services the wireless device can access based on the common key are determined for the wireless device. An applicable engine for determining network service access rights as part of seamlessly onboarding a wireless device using a unique pre-shared key, such as the network service access rights determination engines described in this paper, can determine network service access rights for the wireless device based on the common key. Network service access rights for the wireless device can be determined using key data.

The flowchart 600 continues to module 606, where transmission of data to and from the wireless device through a wireless network is controlled according to the network service access rights. An applicable engine for controlling transmission of data to and from a wireless device as part of seamlessly onboarding the wireless device using a unique pre-shared key, such as the data transmission management engines described in this paper, can control transmission of data to and from the wireless device according to the network service access rights.

The flowchart 600 continues to module 608, where the wireless device is seamlessly onboard using a unique pre-shared key as part of the network services. In seamlessly onboarding the wireless device using a unique pre-shared key, a unique pre-shared key can be assigned to the wireless device. An applicable engine for assigning a unique pre-shared key as part of seamless onboarding, such as the unique pre-shared key assignment engines described in this paper, can assign a unique pre-shared key to the wireless device. Additionally, in seamlessly onboarding the wireless device using a unique pre-shared key, a unique pre-shared key assigned to the wireless device can be provided to the wireless device. An applicable engine for communicating with a wireless device as part of seamlessly onboarding the wireless device, such as the seamless onboarding communication engines described in this paper, can provide a unique pre-shared key to the wireless device.

Figure 7:
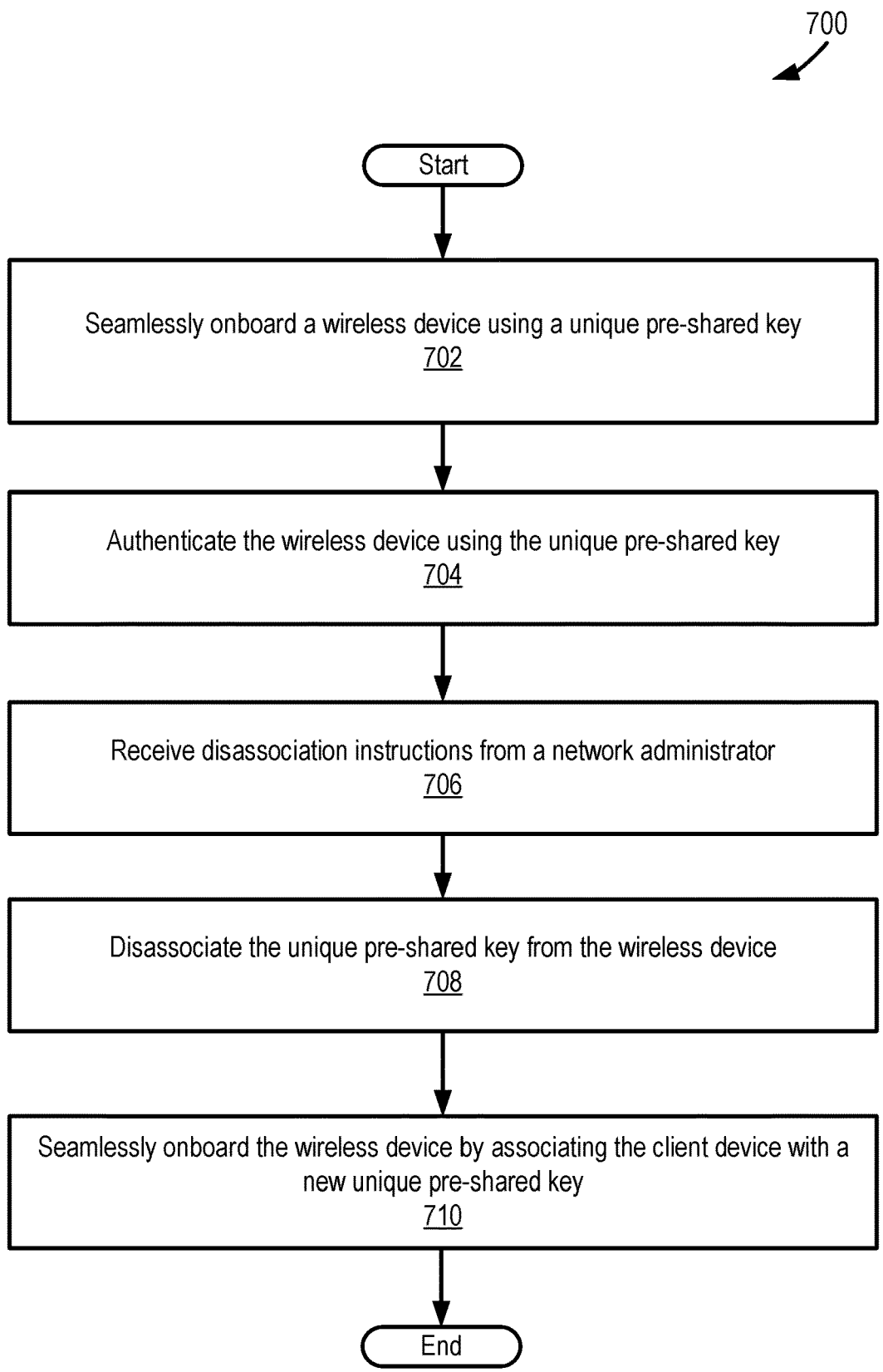
FIG. 7 depicts a flowchart of an example of a method for disassociating a unique pre-shared key from a wireless device seamlessly onboarded using the unique pre-shared key.

FIG. 7 depicts a flowchart 700 of an example of a method for disassociating a unique pre-shared key from a wireless device seamlessly onboarded using the unique pre-shared key. The flowchart 700 begins at module 702, where a wireless device is seamlessly onboarded using a unique pre-shared key. In seamlessly onboarding a wireless device using a unique pre-shared key, a unique pre-shared key can be assigned to a wireless device. An applicable engine for assigning a unique pre-shared key as part of seamless onboarding, such as the unique pre-shared key assignment engines described in this paper, can assign a unique pre-shared key to a wireless device. In seamlessly onboarding a wireless device using a unique pre-shared key, a unique pre-shared key assigned to the wireless device can be provided to the wireless device. An applicable engine for communicating with a wireless device as part of seamlessly onboarding the wireless device for accessing a wireless network, such as the seamless onboarding communication engines described in this paper, can provide a unique pre-shared key to a wireless device.

The flowchart 700 continues to module 704, where the wireless device is authenticated using the unique pre-shared key. An applicable engine for authenticating a wireless device using keys, such as the key-based authentication engines described in this paper, can authenticate the wireless device using the unique pre-shared key. The wireless device can be authenticated for the wireless network using authentication data generated using the unique pre-shared key.

The flowchart 700 continues to module 706, where disassociation instructions are received from a network administrator. An applicable engine for communicating with a network administrator for purposes of seamlessly onboarding a wireless device using a unique pre-shared key, such as the network administrator interfaces described in this paper, can receive disassociation instructions from a network administrator. Disassociation instructions can specify to reassign the wireless device to another unique pre-shared key.

The flowchart 700 continues to module 708, where the unique pre-shared key is disassociated from the wireless device. An applicable engine for assigning unique pre-shared keys to wireless devices for purposes of seamlessly onboarding the wireless using a unique pre-shared key, such as the unique pre-shared key assignment engines described in this paper, can disassociate the unique pre-shared key from the wireless device. In various implementations, key data can be updated to reflect that the unique pre-shared key is no longer associated with the wireless device.

The flowchart 700 continues to module 710, where the wireless device is seamlessly onboarded by associating the wireless device with a new unique pre-shared key. In seamlessly onboarding the wireless device using a new unique pre-shared key, a new unique pre-shared key can be assigned to the wireless device. An applicable engine for assigning a unique pre-shared key as part of seamless onboarding, such as the unique pre-shared key assignment engines described in this paper, can assign a new unique pre-shared key to the wireless device. In seamlessly onboarding the wireless device using a new unique pre-shared key, a new unique pre-shared key assigned to the wireless device can be provided to the wireless device. An applicable engine for communicating with a wireless device as part of seamlessly onboarding the wireless device, such as the seamless onboarding communication engines described in this paper, can provide a new unique pre-shared key to the wireless device.

These and other examples provided in this paper are intended to illustrate but not necessarily to limit the described implementation. As used herein, the term "implementation" means an implementation that serves to illustrate by way of example but not limitation. The techniques described in the preceding text and figures can be mixed and matched as circumstances demand to produce alternative implementations.

We claim:

1. A method, comprising:
   receiving, through a wireless network and from a wireless device of a plurality of wireless devices, authentication data generated using a common key for providing a plurality of network services to the plurality of wireless devices;
   determining, based on the authentication data and the common key, whether an onboarding service is available to the wireless device using a pre-shared key that is uniquely associated with the plurality of wireless devices associated with a profile;
   based on the determining, providing the pre-shared key to the wireless device through the wireless network over a connection established using the common key; and
   onboarding the wireless device to provide a set of network services associated with the pre-shared key.

2. The method of claim 1, further comprising configuring the wireless device to be authenticated using the pre-shared key absent intervention from a network administrator.

3. The method of claim 1, further comprising:
   controlling transmission of data to and from the wireless device in response to onboarding the wireless device using the pre-shared key.

4. The method of claim 1, further comprising:
   receiving network service access rights instructions indicating network service access rights for the wireless device in authenticating with the pre-shared key; and
   updating key data to indicate an association of the network service access rights for the wireless device with the pre-shared key.

5. The method of claim 1, further comprising:
   determining a first media access control (MAC) address of the wireless device; and
   binding the first MAC address to the pre-shared key for determining if the pre-shared key is compromised in response to onboarding using the pre-shared key and a second MAC address that is different than the first MAC address.

6. The method of claim 1, further comprising:
   determining a first media access control (MAC) address of the wireless device using the authentication data; and
   binding the first MAC address to the pre-shared key for determining if the pre-shared key is compromised in response to onboarding using the pre-shared key and a second MAC address that is different than the first MAC address.

7. The method of claim 1, further comprising:
   determining a first media access control (MAC) address of the wireless device;
   binding the first MAC address to the pre-shared key for determining if the pre-shared key is compromised in response to onboarding using the pre-shared key and a second MAC address that is different than the first MAC address; and
   updating key data to indicate the binding of the first MAC address to the pre-shared key.

8. The method of claim 1, further comprising providing the pre-shared key to the wireless device by displaying the pre-shared key at the wireless device to input or identify the pre-shared key for authenticating the wireless device.

9. The method of claim 1, further comprising:
   receiving disassociation instructions;
   disassociating the wireless device from the pre-shared key in response to the disassociation instructions;
   assigning a new pre-shared key to the wireless device; and
   providing the new pre-shared key to the wireless device as part of onboarding the wireless device.

10. The method of claim 1, further comprising determining, based on the authentication data and the common key, network service access rights associated with the common key or the pre-shared key.

11. The method of claim 1, wherein the authentication data comprises at least one of a key, data generated using the key, user data describing the profile associated with the wireless device, and data of the wireless device that comprises a media access control (MAC) address of the wireless device.

12. A system, comprising:
    a memory for storing operations;
    one or more processors communicatively coupled to the memory and configured to perform the operations comprising:
    receiving, through a wireless network from a wireless device of a plurality of wireless devices, authentication data generated using a common key for providing a plurality of network services to the plurality of wireless devices;
    determining, based on the authentication data and the common key, whether an onboarding service is available to the wireless device using a pre-shared key that is uniquely associated with the plurality of wireless devices associated with a profile;

based on the determining, providing the pre-shared key to the wireless device through the wireless network over a connection established using the common key; and onboarding the wireless device to provide a set of network services associated with the pre-shared key.

13. The system of claim 12, wherein the operations further comprise configuring the wireless device to enable onboarding using the pre-shared key absent intervention from a network administrator.

14. The system of claim 12, wherein the operations further comprise:

controlling transmission of data to and from the wireless device through the network services as part of onboarding the wireless device using the pre-shared key.

15. The system of claim 12, wherein the operations further comprise:

receiving network service access rights instructions indicating network service access rights for the wireless device; and updating key data to indicate an association of the network service access rights for the wireless device with the pre-shared key.

16. The system of claim 12, wherein the operations further comprise:

determining a first media access control (MAC) address of the wireless device; and binding the first MAC address to the pre-shared key for determining if the pre-shared key is compromised in response to onboarding using the pre-shared key and a second MAC address that is different than the first MAC address.

17. The system of claim 12, wherein the operations further comprise:

determining a first media access control (MAC) address of the wireless device using the authentication data generated using the common key; and binding the first MAC address to the pre-shared key for determining if the pre-shared key is compromised in response to onboarding using the pre-shared key and a second MAC address that is different than the first MAC address.

18. The system of claim 12, wherein the operations further comprise providing the pre-shared key to the wireless device by displaying the pre-shared key at the wireless device to input or identify the pre-shared key for onboarding the wireless device.

19. The system of claim 12, wherein the operations further comprise:

receiving disassociation instructions;

disassociating the wireless device from the pre-shared key in response to the disassociation instructions;

assigning a new pre-shared key to the wireless device; and providing the new pre-shared key to the wireless device as part of onboarding the wireless device.

20. A non-transitory, tangible computer-readable device having instructions stored thereon that, when executed by at least one computing device, causes the at least one computing device to perform operations comprising:

receiving, through a wireless network from a wireless device of a set of wireless devices of a plurality of wireless devices, authentication data generated using a common key for providing a plurality of network services to the plurality of wireless devices;

determining, based on the authentication data and the common key, whether an onboarding service is available to the wireless device using a pre-shared key that is uniquely associated with the set of wireless devices associated with a profile;

based on the determining, providing the pre-shared key to the wireless device through the wireless network over a connection established using the common key; and onboarding the wireless device to provide a set of network services associated with the pre-shared key.

* * * * *